United States Patent [19]

Beck et al.

[11] Patent Number: 4,637,343
[45] Date of Patent: Jan. 20, 1987

[54] BROODER UNIT AND SYSTEM

[76] Inventors: Herbert W. Beck, Rte. 1, Box 303H, Farmington, Mo. 63640; Ronald L. Franken, Rte. 1, Linn, Mo. 65051

[21] Appl. No.: 731,508

[22] Filed: May 7, 1985

[51] Int. Cl.[4] .............................................. A01K 31/19
[52] U.S. Cl. ..................................................... 119/31
[58] Field of Search ........................ 119/31, 32, 33, 34, 119/30

[56] References Cited

U.S. PATENT DOCUMENTS

| | | | |
|---|---|---|---|
| 773,660 | 11/1904 | Malmgren | 237/15 |
| 791,188 | 5/1905 | Evans | 237/4 |
| 833,638 | 10/1906 | Shoemaker | 237/15 |
| 862,180 | 8/1907 | Mikolasek | 237/15 |
| 944,383 | 12/1909 | Skinner et al. | 237/4 |
| 969,710 | 9/1910 | Lore | 237/15 |
| 1,015,290 | 1/1912 | Bryant | 237/4 |
| 1,042,635 | 10/1912 | Adair | 237/4 |
| 1,103,189 | 7/1914 | Fischer | 237/15 |
| 1,160,497 | 11/1915 | Dale | 237/4 |
| 1,161,494 | 11/1915 | McKay | 237/4 |
| 1,320,586 | 11/1919 | Tateoka | 237/15 |
| 1,581,857 | 4/1926 | Morison | 119/31 |
| 1,837,065 | 12/1931 | Pierce | 237/4 |
| 1,910,301 | 5/1933 | Martin | 237/4 |
| 2,281,776 | 5/1942 | Lyon | 119/31 |
| 3,139,858 | 7/1964 | Martin | 119/31 |
| 3,396,704 | 8/1968 | Hillstrom | 119/31 |
| 4,173,947 | 11/1979 | Whiteside, Jr. | 119/16 |
| 4,360,003 | 11/1982 | Hardy | 126/368 |

OTHER PUBLICATIONS

Hardy Manufacture Co., Inc., Philadelphia, MS 39350, Literature on Hardy Outside Woodburning Heater.
Shenanadoah Manufacturing Co., Inc., Harrisonburg, VA 22801, Literature on Gas-fired brooders.

*Primary Examiner*—Hugh R. Chamblee
*Attorney, Agent, or Firm*—Rogers, Howell, Moore & Haferkamp

[57] ABSTRACT

A brooder unit and system for installation in a brooder building for applying heat to young animals such as chicks. The system includes a plurality of brooder units, each unit having a hood with an air inlet and an air outlet. A hot liquid heat exchanger is housed with the hood between the air inlet and outlet, and a fan is housed within the hood between the air inlet and the heat exchanger for circulating air drawn into the inlet, over the heat exchanger, and out the air outlets. The hood is tapered outwardly such that the air outlet is substantially larger in cross-section than the air inlet. The brooder units are supported with their air outlets opening downwardly and spaced a selected distance above the floor of the building. Hot liquid is supplied to the heat exchangers of the brooder units, and electrical power is supplied to the fans.

18 Claims, 6 Drawing Figures

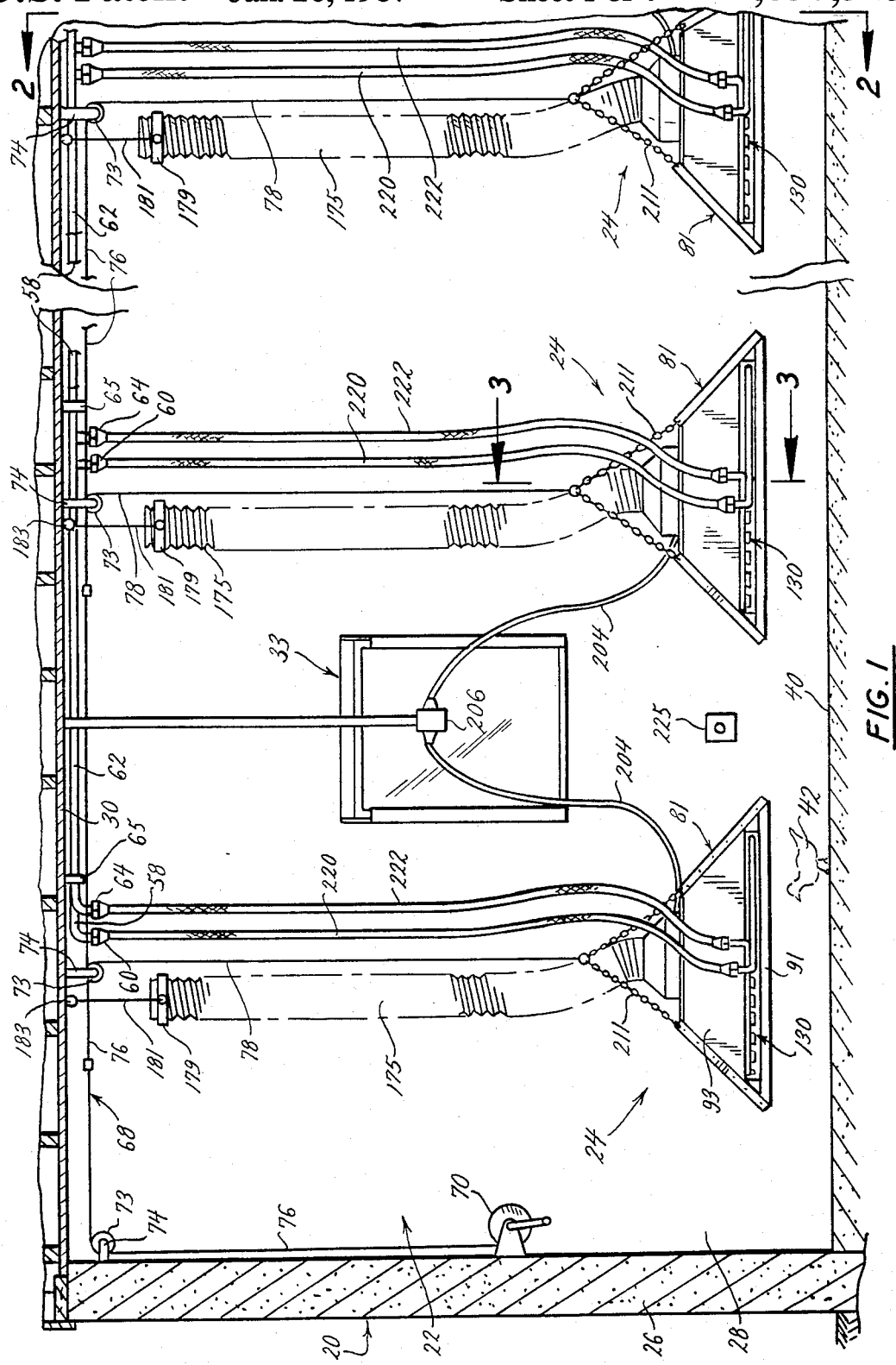

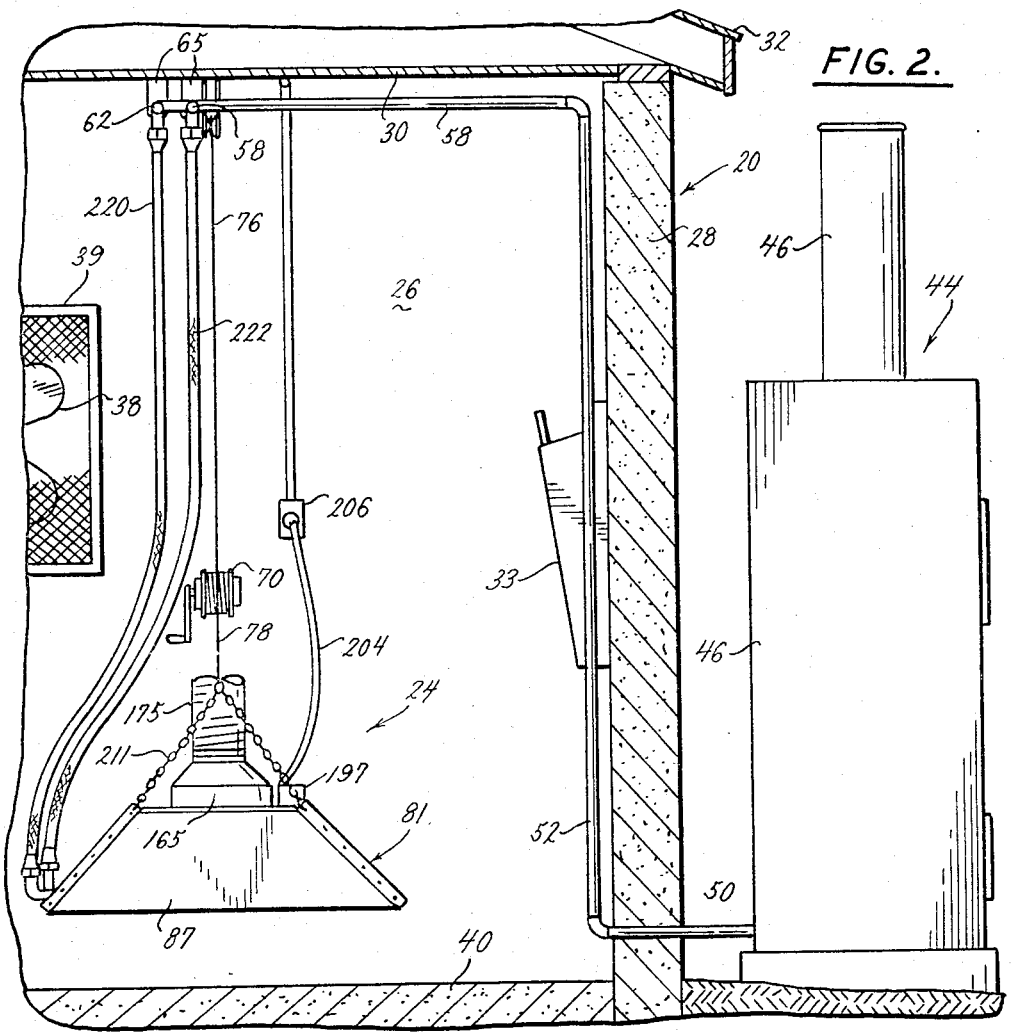
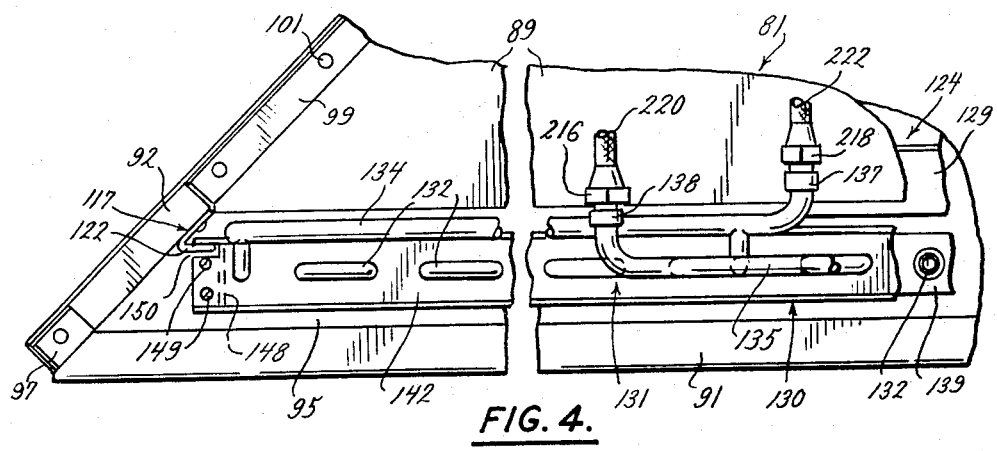

BROODER UNIT AND SYSTEM

BACKGROUND AND SUMMARY OF THE INVENTION

The present invention relates to a brooder unit and system for young animals such as chicks and the like. More particularly, the present invention relates to a brooder unit and system wherein individual brooders have hoods with heat exchangers utilizing hot water or other suitable liquid as the heat exchange medium. A fan within the hood circulates air over the heat exchanger and onto the chicks.

Various types of brooders are known in the art. One well known type uses gas as the source of heat with a reflective plate, such as a ceramic plate, within a hood to reflect radiant heat onto the chicks. Such units have several disadvantages, including the emission of gaseous contaminants and excessive moisture. Such brooders present the additional safety risk associated with an open gas flame.

Another type of known brooder is disclosed in Pierce U.S. Pat. No. 1,837,065 where the heat source includes a fan for circulating air through a hot water heat exchanger, but where the heat source is located near the ceiling of the building remote from the chicks. Other examples of brooders are shown by U.S. Pat. Nos. 773,660; 791,188; 833,638; 862,180; 944,383; 969,710; 1,015,290; 1,042,635; 1,103,189; 1,160,497; 1,161,494; 1,320,586; and 1,910,301; some of which also use hot water as a means for supplying heat to the chicks.

The present invention offers an improved brooder unit and system with advantages over those known in the art. The brooder system of the present invention includes a plurality of like brooders, each individually controlled and individually adjustable to provide the desired amount of heat to the chicks. The brooders are energy-efficient and provide an exceptionally safe environment.

Each brooder unit generally comprises a tapered hood which may be pyramid-shaped and which has a fan at the top. A heat exchanger is mounted near the enlarged lower opening of the hood such that the fan circulates air through the heat exchanger and onto the chicks positioned beneath the brooder, the bottom opening of the hood being typically a few inches above the floor of the building in which the system is installed. Hot water or other suitable liquid is used as the heat exchange medium, and preferably is heated externally of the building for circulation through the heat exchangers of the various brooders within the building.

The hood is configured such that the air flow is generally spread over the heat exchanger and lower outlet opening, and to prevent the chicks from roosting on the hood or becoming injured such as by contact with the fan. The brooders are easily adjustable in height to accommodate chicks of different ages and sizes. Also, in accordance with the invention, provision is made to extract warmer air near the ceiling of the building for circulation by the fan over the heat exchanger with increased cost effectiveness. The heat exchanger is easily inserted and removed from the hood for ease of cleaning both the heat exchanger and other brooder components.

Brooders of the present invention are easily adapted for installation as a system of any size from small buildings and a relatively small number of chicks up to very large buildings producing millions of chicks on a continuous basis year-round and regardless of outside temperature. With a system installation, each brooder has a thermostat for individual control of the temperature at that brooder, and in addition there is a thermostat control for controlling the entire system within the building.

Thus, the brooder of this invention provides close proximity of the fan to the heat exchanger and of the heat exchanger to the chicks to apply heat evenly and efficiently directly to the chicks. The pyramid shape of the hood aids in providing even heat distribution together with air circulation that allows recapture of the heated air for greater efficiency. There is no hazard of inadvertent contact by the chicks with an open gas flame, and the other disadvantages of excessive moisture and toxic gases associated with a gas brooder are eliminated. The brooder of this invention is exceptionally safe, offers versatility in temperature control, offers easy access to brooder components for cleaning or replacement, is versatile, and is exceptionally efficient.

DESCRIPTION OF THE DRAWINGS

FIG. 1 is a front view of a section of a brooder building showing the brooder system and individual brooders, with some parts shown broken;

FIG. 2 is a section taken on the line 2—2 of FIG. 1;

FIG. 4 is a section taken on the line 4—4 of FIG. 3 with some parts shown broken;

DESCRIPTION OF THE PREFERRED EMBODIMENT

Figure 3:
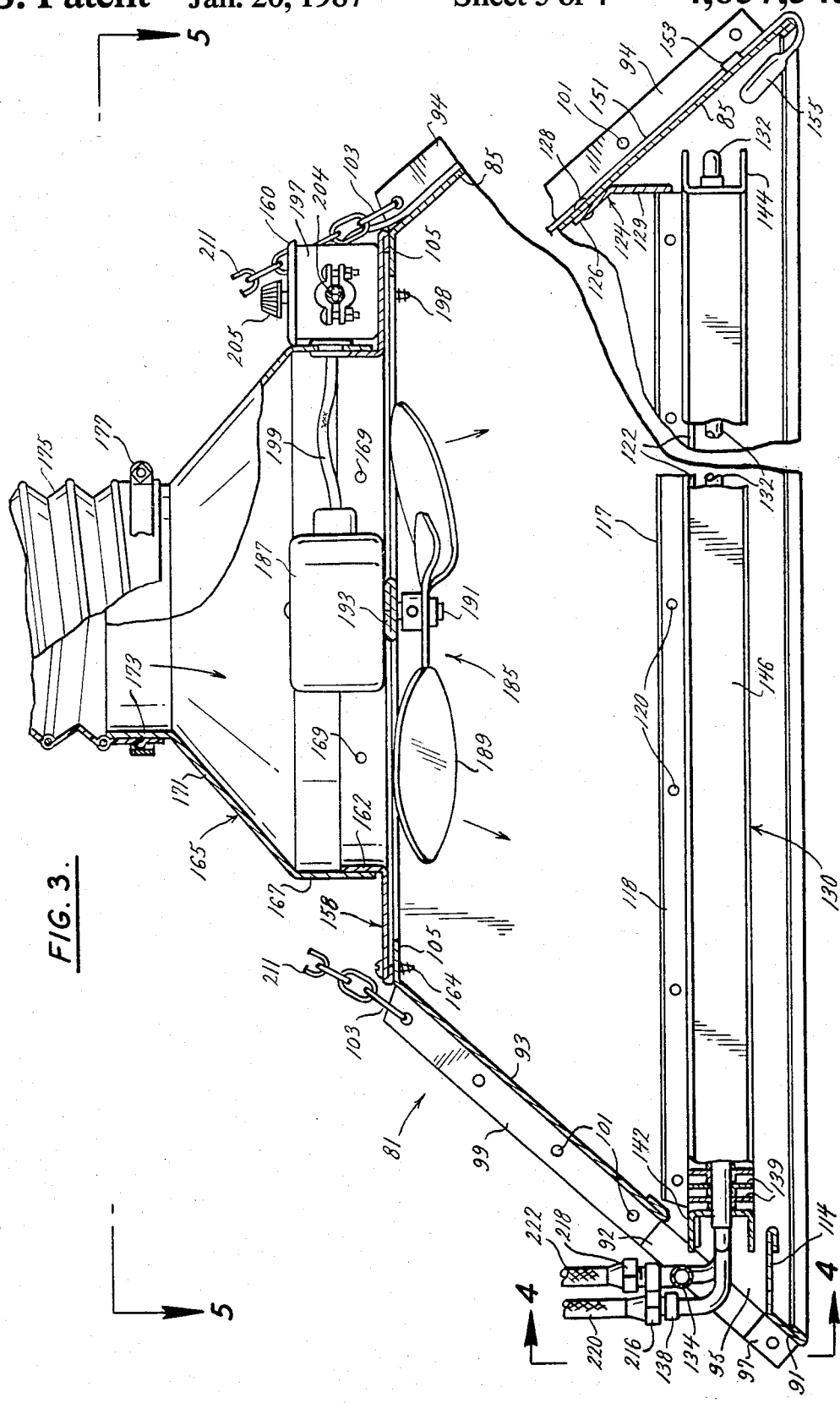
FIG. 3 is a section taken on the line 3—3 of FIG. 1 showing parts of an individual brooder, with some parts shown broken.
Figure 5:
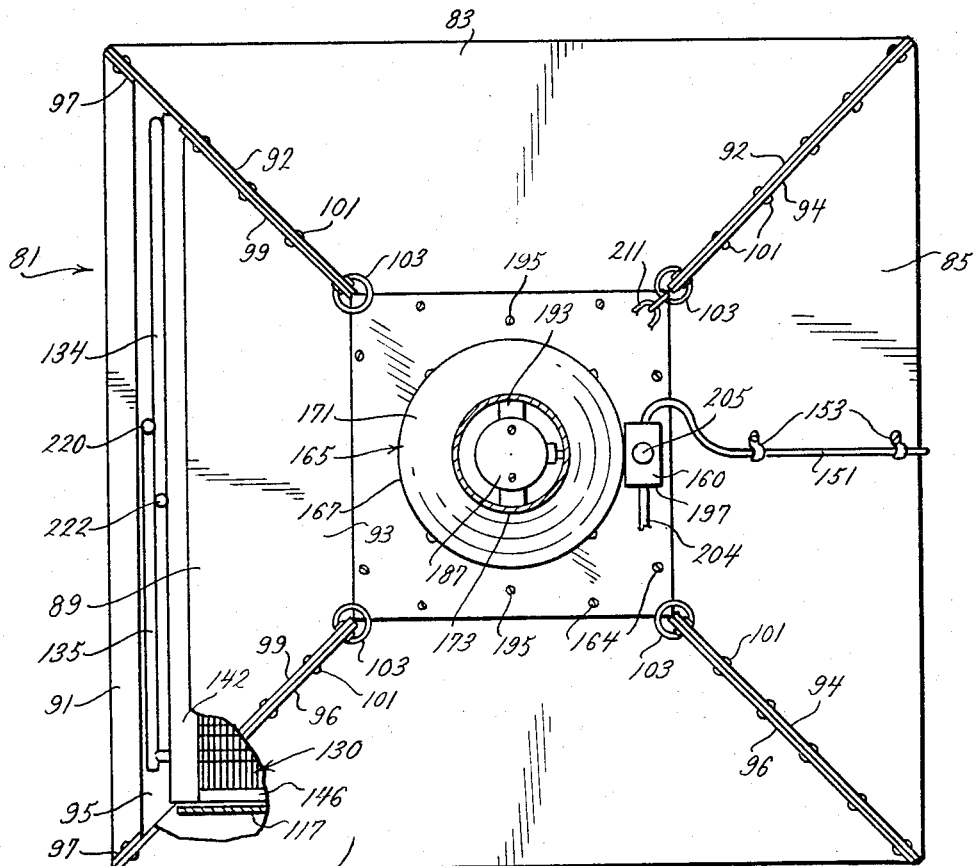
FIG. 5 is a section taken on the line 5—5 of FIG. 3, with some parts shown broken.
Figure 6:
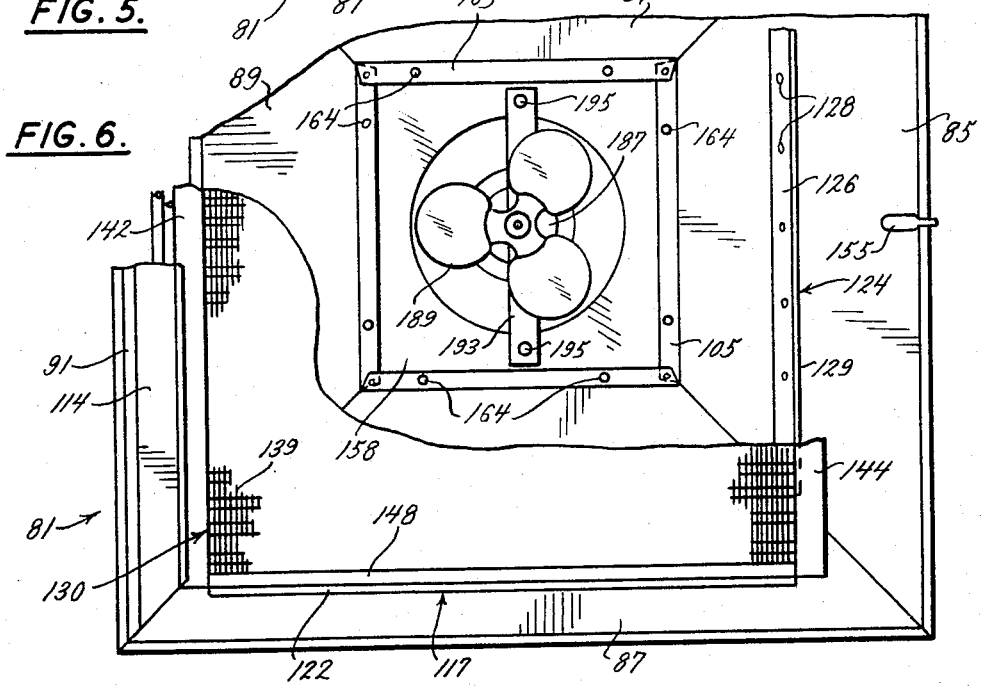
FIG. 6 is a view from beneath the brooder of FIG. 3, with some parts shown broken.

With reference to the drawings, a brooder building 20 has within it a brooder system 22 with three individual brooders 24 of the present invention shown mounted within building 20. Any number of brooders may be in the system as required.

The building 20 comprises vertical end walls such as 26 and side walls such as 28, with a ceiling 30 and roof 32 thereabove in conventional fashion. Wall 28 may have a plurality of windows 33.

End wall 26 has an exhaust fan 38 mounted within a window 39 which can have chicken wire screens on either side thereof, to permit exhaustion of gas and moisture within building 20. The floor 40 may be of ground or other suitable surface.

As seen in FIG. 2, exterior to building 20 is a hot water heater 44, which may be of a woodburning type such as disclosed in U.S. Pat. No. 4,360,003, or other suitable type, having a housing 46 and a flue 48 and having a conventional discharge and return water conduit arrangement. Hence, water is discharged through conduit 50, from the bottom of the heater into a vertical pipe 52, and then into a horizontal main feed pipe 58 which extends above the brooders 24 with a plurality of outlets 60 for individual connection to the brooders 24 to feed hot water thereto.

A return pipe 62 runs parallel to pipe 58 and has a plurality of return inlets 64, each of which receives return water from a corresponding brooder 24 for return to the heater. The pipes 58 and 62 are mounted to suspend from ceiling 30 by conventional means such as brackets 65.

A pulley-cable system 68 acts as means to raise and lower the brooders 24, and comprises a winch 70 mounted to wall 26, and rollers 73 and brackets 74 mounted to wall 26 and to ceiling 30. A steel cable 76 extends from the winch over the rollers 73, with cable branches 78 connected thereto and depending from each of the ceiling rollers 73. Each cable branch 78 and the other depending end of the main cable are connected to chains supporting the brooders 24 as will be described.

Each brooder 24 comprises a pyramid frustum shaped hood 81 held above the floor at a height so that the chicks 42 can walk under them. Each hood has four equilateral trapezoidal sides 83, 85, 87 and 89, with side 89 being divided into a lower part 91 and an upper part 93 with an opening 95 formed therebetween for allowing insertion of a heat exchange assembly to be described. The slanted ends of the trapezoids 83, 85 and 87 have outwardly projecting flanges 92, 94 and 96 respectively, while the lower and upper trapezoid portions 91 and 93 have similar flanges 97 and 99 respectively, so that the flanges 91, 93, 95, 97 and 99 rest flush against their corresponding adjacent flanges and are secured to one another by rivets 101. The upper end of each flange 92, 94, 96 and 99 has a hole extending therethrough aligned with the hole in the adjacent flange to receive support rings 103. The upper horizontal end of trapezoids 83, 85, 87 and upper portion 93 of trapezoid 89 each project inwardly into horizontal flanges 105.

The upper end of lower trapezoid portion 91 extends inwardly into a horizontal lip 114 which forms the lower lip of the opening 95. The lower horizontal edges of trapezoids 83, 85 and 87 are each bent back inwardly upon themselves, as are the lower edges of trapezoid portions 91 and 93 and lip 114, to avoid exposure of sharp edges.

The opposite facing trapezoids 83 and 87 each have on their insides a V-shaped track 117 having one side 118 flush against the trapezoids 83 and 87 and secured thereto by a plurality of rivets 120. Both tracks 117 extend horizontally at the same height so that the lower ledge 122 of each track 117 can support an edge of a heater coil frame to be described.

Trapezoid 85 has a baffle 124 having an angled upper end 126 secured to trapezoid 85 by rivets 128, and a lower vertical end 129.

Housed within hood 81 is a heat exchanger assembly 130 comprising copper heat exchange coil 131 having a main serpentine tube section 132 and horizontal inlet and outlet tubes 134 and 135 each of which extends into threaded connectors 137 and 138, respectively. The serpentine section 132 has a plurality of heat exchange fins 139 extending therefrom with air flow passages inbetween the fins. The heat exchanger assembly 130 further comprises at its front and rear ends outwardly extending channels 142 and 144, each having a plurality of holes to allow the serpentine tubing 132 to weave therethrough. Assembly 130 further comprises a pair of outwardly extending parallel side channels 146 and 148 are bent at right angles to form end plates to which the ends of the vertical walls of the front and rear channels 142 and 144 are secured by screws 149 to provide a rigid frame. A notch 150 is provided between the upper edges of the end plates of channels 146 and 148 to receive the track ledge 122 so that the upper horizontal flange of channels 146 and 148 can ride upon track ledge 122 to allow the entire heat exchange assembly 130 to slide in and out of hood 81.

Exterior of trapezoid 85 is a thermocouple conduit 151 secured thereto by clamps 153. Conduit 151 loops beneath the lower edge of trapezoid 85 and connects to a bulb 155 positioned within the hood 81 near the lower opening.

Mounted at the top of hood 81 is a square plate 158 having a vertical cylindrical neck 162, with the outer edge of the plate turned inwardly and secured to the top horizontal flanges 105 of trapezoids 83, 85, 87 and the upper trapezoid portion 93 as by screws 164. An intake funnel 165 has a lower cylindrical end 167 fitted around neck 162 and secured thereto by rivets 169. Section 167 extends upwardly into a conical section 171 which extends into a cylindrical throat 173. A flexible air intake hose 175 is secured to throat 173 by an annular screw clamp 177. Hose 175 extends upwardly with a like annular screw clamp 179 clamped about its upper end so that hose 175 can be suspended by a wire 181 connected to clamp 179 and to a fastener 183 mounted to the ceiling 30.

At the top of hood 81 is a fan assembly 185 comprising a motor 187 and a blade 189 driven through a shaft 191. A support strip 193 has a central hole therethrough receiving drive shaft 191. Strip 193 is secured to motor 187 by screws, and the outer ends of strip 193 are fastened by screws 195 to the plate 158.

A junction box 197 is secured by screws 198 to the top of plate 160 for supplying electrical power to the fan through conductors 199 and 204, a thermostat 205 within the box, and a conventional electrical outlet 206. The thermocouple conduit 151 is connected at box 197 to the thermostat to control the operation of the fan.

Chains 211 form a sling connected to the rings 103 on the four corners at the top of hood 81, and connected to a branch cable 78 or to the depending end of cable 76 to support the brooder above the floor.

The heat exchanger coil inlet and outlet are connected to threaded fittings 216 and 218 of flexible water hoses 220 and 222 which extend upwardly with like fittings 216 and 218 at their upper ends connected to feed line 60 and return 64.

Mounted on a wall of the building is a thermostat 225 controlling the supply of power to all the brooder fans. Thermostat 225 can be set so that power to all brooder fans is shut off when the temperature in the building as sensed by the thermostat rises to a selected setting.

The hood 81, plate 158, funnel 165, tracks 117, and baffle 124 can all be made of sheet metal.

In operation, it is evident from the foregoing that the brooder system of the present invention is easily installed, and each brooder unit is easily inserted and removed from the system. For example, to remove a brooder unit such as for repair or cleaning, it is unplugged from the wall outlet, the water hoses are disconnected from the heat exchanger, the flexible air hose is disconnected, and the unit is detached from the overhead cable. Access to the heat exchanger is made easy by simply sliding the heat exchanger out the opening 95. Should access to the fan be required, it is simply necessary to remove the plate 158 to which the fan and its support strip 193 are mounted.

To operate the system, hot water from the external heater 44 is fed to the heat exchangers of each of the units. The fans of each unit draw air from near the ceiling of the building downwardly through the flexible air hose 195, over the heat exchanger and onto the chicks. The pyramid shape of the hood spreads the air over the entire heat exchange surface so that there is a large area at the bottom of the hood where the chicks can receive the warm air. It will be noted that the heat exchanger is located near the large bottom opening and has an effective heat exchange surface substantially as great as the cross-sectional area of the tapered hood where the heat exchanger is located so that warm air is spread over the entire lower opening. The warm air exists the hood and circulates outwardly in all directions so that chicks in the general vicinity will receive the warm air as well as those directly beneath the hood. Drawing the warm air from near the ceiling is more efficient and saves energy costs.

The temperature of the air at each unit is regulated by the thermostat at that unit as sensed by the bulb near the bottom opening. In addition, the overall temperature of the building is regulated by the central thermostat 225 such that when the temperature of the building reaches a certain setting, the power to all of the brooders is turned off. In practice, it has been found that when the temperature setting of the central thermostat is satisfied, the temperature of the air beneath each of the brooders is sufficiently high such that all of the brooders can be turned off. Hence, the purpose of the central thermostat is to prevent the overall temperature in the building from becoming excessive such as in summer when the hot sun overheats the building. Under such circumstances, it has been found desirable to have the exhaust fan 38 controlled from the central thermostat to quickly exhaust the excessive heat from the building. The precise temperature controls of this invention make it possible, by gradually lowering the thermostat settings over time, to condition the livestock for introduction into a more harsh climate for final growth.

With the brooder unit and system of the present invention, the water heater is external to the building so that there is no combustion inside the building. There are no exposed gas flames which produce excessive moisture and toxic gases. The construction of each brooder with the hood, fan, and heat exchanger as a unit, produces safe and even heat in close proximity to the chicks, and further provides individual temperature control for each unit. The lower portion of the brooder unit presents a smooth sloping external surface to prevent the chicks from roosting on the unit, and the heights of the units are easily adjusted to accommodate the size of the chicks.

Thus, there has been described a brooder unit and system that is exceptionally efficient, presents a healthful environment, and possesses the other advantages heretofore explained.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

What is claimed is:

1. A brooder system in a brooder building for applying heat to young animals such as chicks and the like comprising a plurality of brooder units, each unit having a hood with an air inlet and an air outlet, a hot liquid heat exchanger housed within the hood between the air inlet and outlet and extending over substantially the entire cross-sectional area of the hood at the location of the heat exchanger, and a fan housed within the hood between the air inlet and heat exchanger for circulating air drawn into the inlet, over the heat exchanger, and spreading air over substantially the entire air outlet opening, the hood being tapered outwardly such that the air outlet is substantially larger in cross-section than the air inlet, means for supporting the brooder units with the air outlets opening downwardly and spaced a selected distance above the floor of the building, means for supplying hot liquid to the heat exchangers of the brooder units, and means for supplying electrical power to the fans of the units.

2. The brooder system of claim 1 wherein the support means further comprises an overhead cable system for selectively adjusting the heights of the brooder units.

3. The brooder system of claim 1 further comprising flexible air hoses with their lower ends connected to the air inlets of the brooder units, and means for supporting said hoses with their upper ends near the ceiling of the building to draw the warm air near the ceiling into the brooder units.

4. The brooder system of claim 1 wherein the heat exchanger of each unit is located near its air outlet, and wherein the heat exchange surface of the heat exchanger extends substantially over the entire cross-sectional area of the hood at the location of the heat exchanger, whereby the air heated by the heat exchanger is spread substantially over the entire air outlet.

5. The brooder system of claim 1 wherein the hot liquid supply means further comprises a heater externally of the building for heating the liquid, and conduit means for delivering the liquid between the heater and the brooder units.

6. The brooder system of claim 5 further comprising flexible hoses for connecting the heat exchangers of the brooder units to the water conduits, allowing flexibility for adjusting the heights of the units.

7. The brooder system of claim 1 wherein each unit includes a thermostat for controlling the temperature of the air at the air outlet of the unit.

8. The brooder system of claim 7 further comprising a thermostat for sensing the temperature within the building and for controlling the power to all of the brooder units in response thereto.

9. The brooder system of claim 8 further comprising an exhaust fan for exhausting air from the building in response to the building thermostat.

10. A brooder unit for supplying heat to young animals such as chicks and the like comprising a hood having an air inlet and an air outlet, the hood tapering outwardly toward the air outlet and being adapted for positioning with the air outlet opening downwardly and spaced above the floor of a brooder building, a hot liquid heat exchanger housed within said hood near the air outlet, and a fan within said hood between the air inlet and the heat exchanger for drawing air from the air inlet, through the heat exchanger, and out the air outlet, the heat exchange surface extending substantially over the entire cross-sectional area of the hood at the location of the heat exchanger, whereby the air heated by the heat exchanger is spread substantially over the entire outlet opening.

11. The brooder unit of claim 10 further comprising a flexible air hose with its lower end connected to the air inlet, and adapted to be supported with its upper end near the ceiling of the brooder building to draw warm air from the ceiling of the building into the hood.

12. The brooder unit of claim 10 further comprising a thermostat with a temperature sensor for sensing the temperature of the air downstream of the heat exchanger controlling the fan of that unit for controlling the temperature of the outlet air.

13. The brooder unit of claim 10 wherein the heat exchanger is generally rectangular, and further comprising means for slidingly engaging the heat exchanger within the hood.

14. The brooder unit of claim 13 wherein the air outlet is substantially rectangular in cross-section.

15. The brooder unit of claim 10 wherein said hood is pyramid shaped, the cross-sectional area of the hood both at the location of the heat exchanger and the air outlet opening being substantially greater than the cross-sectional area of the hood at the location of the fan.

16. The brooder unit of claim 15 wherein the heat exchanger is slidingly engaged within the hood for ease of installation and removal of the heat exchanger.

17. A brooder unit for applying heat to young animals such as chicks and the like comprising a generally frusto-pyramidal hood having an air inlet and an air outlet, the hood tapering outwardly toward the air outlet and being adapted for positioning with the air oulet opening above the floor of a brooder building, a hot liquid heat exchanger, means for slideably mounting the heat exchanger within the hood, near the air outlet, the heat exchanger extending over substantially the entire cross-sectional area of the hood, a fan within the hood above the heat exchanger and below the air inlet for drawing air from the air inlet, downwardly through the heat exchanger to heat the air and spread the air over substantially the entire air outlet opening.

18. The brooder unit of claim 17 wherein the means for slideably mounting the heat exchanger within the hood comprises tracks on opposite sides of the hood, near the air outlet, for engaging the heat exchanger.

* * * * *